July 16, 1940.  W. H. C. NESS ET AL  2,207,814
HOT FOOD TABLE
Filed Dec. 19, 1938  2 Sheets-Sheet 1

WILLIAM H. C. NESS
MELVILLE L. SILVERSTONE
INVENTORS.

BY
ATTORNEY.

July 16, 1940.    W. H. C. NESS ET AL    2,207,814
HOT FOOD TABLE
Filed Dec. 19, 1938    2 Sheets-Sheet 2
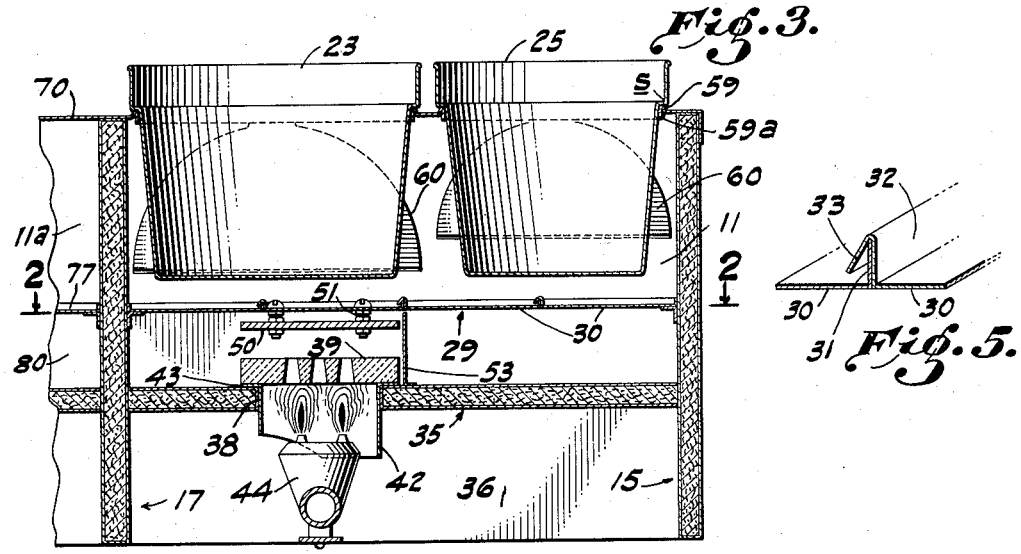
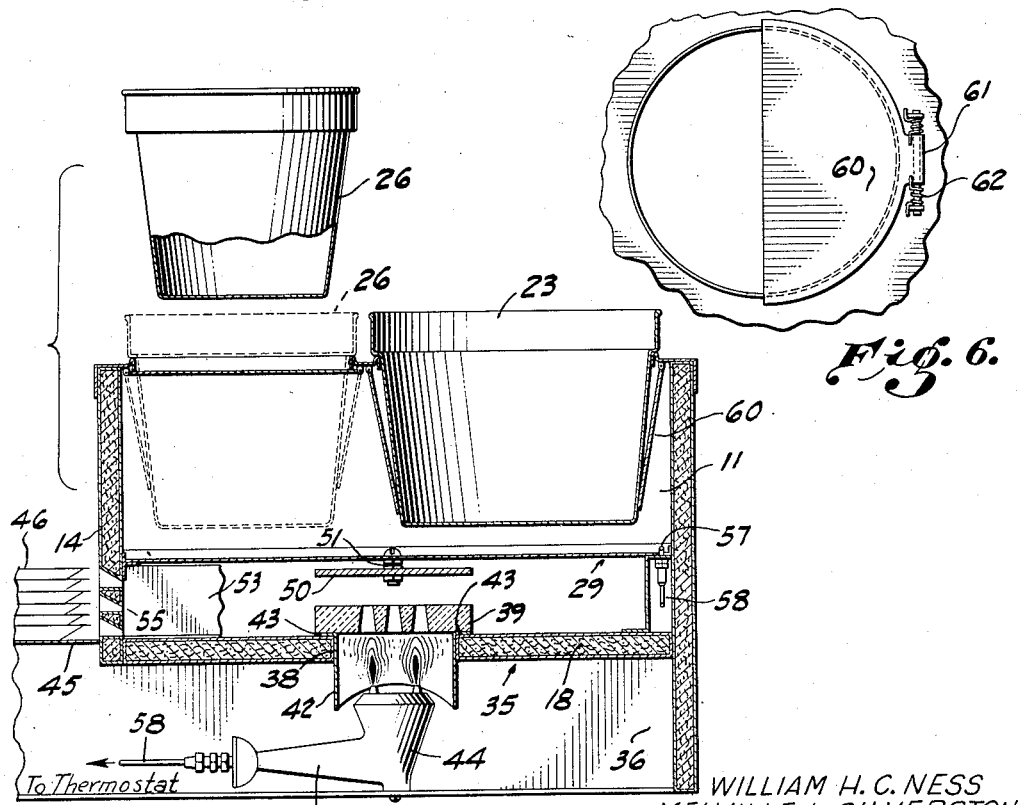
WILLIAM H. C. NESS
MELVILLE L. SILVERSTONE
INVENTORS.
BY 
ATTORNEY.

Patented July 16, 1940

2,207,814

UNITED STATES PATENT OFFICE 2,207,814

HOT FOOD TABLE

William H. C. Ness and Melville L. Silverstone, Los Angeles, Calif., assignors to National Cornice Works, Los Angeles, Calif.

Application December 19, 1938, Serial No. 246,604

6 Claims. (Cl. 126—39)

This invention relates to a method and apparatus for air heating foods.

It is an object of the invention to provide a means for more uniformly heating the contents of food-containing pots. Heretofore, by the usual method employed in restaurants, the pots have been positioned with their lower portions submerged in a body of heated water to keep the food contained in them in a heated condition. But, this method has serious drawbacks—one of them being that the water level is apt to be lower than the level of the soups or other foods contained in the pots, thus failing to heat properly the upper part of the contents of each pot. This defect is overcome by this invention.

By this invention, different food containers can be maintained at different temperatures by the same common heating chamber, there being provided in an immediately underlying relation to said chamber a combustion chamber which is furnished with one or more baffle plates whereby a longer, less direct current of heated air is caused to radiate heat in a progressively decreasing manner up under a series of pots which extend downwardly into said heating chamber.

Another object of the invention is to provide improved means under the pots to catch any spillage from them, said means being of a sectional character, the individual sections of which may be conveniently removed and replaced after having the spillage removed from them.

The invention further relates to an apparatus for utilizing both heat radiation and heat convection more efficiently in a single apparatus. By this invention, the entire food-containing portion of each pot is exposed to a surrounding medium heated to substantially the same temperature.

One of the heat economizing features of the invention resides in the fact that, after a stream of heated air has been efficiently used to keep a series of food containers in a suitably, variously heated condition, the same air is vented in such a manner as to be utilized to heat the dishes in which the foods from the containers are to be served.

Still another object is to provide an improved means whereby each pot opening is automatically closed when the pot is removed therefrom, thereby preventing the removal of the pot to cause any heat to be wasted.

It is a still further object of the invention to overcome the possibility (which has hitherto existed in constructions for maintaining food containers in a heated condition by using a body of hot water) of food spilling from the pots into and contaminating the body of water used to keep them hot. Where it is necessary to use alkaline water in a heating tank, spillage thereinto will often adhere tenaciously to the interior surface of the tank, owing to the chemical action of the alkaline element therein, thus making it more difficult to keep the tank clean and sanitary.

Other objects, advantages, and features of invention will hereinafter appear.

Referring to the accompanying drawings, which illustrate what is at present deemed to be a preferred embodiment of the invention, Fig. 1 is a perspective view of the complete apparatus, wall portions thereof being broken away in order to show interior construction more clearly.

Fig. 3 is a vertical section on line 3—3 of Fig. 2.

Figure 2:
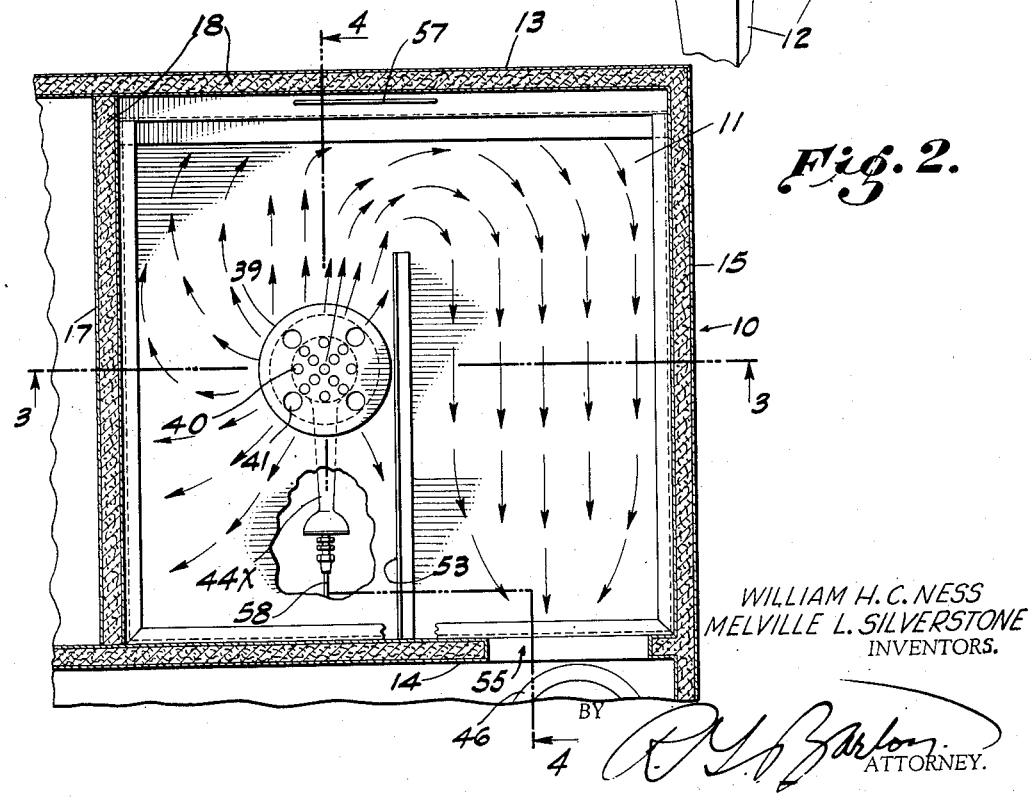
Fig. 2 is a horizontal section of the structure shown in Fig. 1, except that the left-hand portion thereof is broken away in order to economize space. The plane of section for this view is indicated by line 2—2 on Fig. 3.

Fig. 4 is a vertical section on line 4—4 of Fig. 2. In this view, one of the pots is shown in dotted lines in its operative position and in full lines elevated above the opening which it normally occupies. The pot which is shown in full lines has its bottom portion sectioned in order to show its wall construction more clearly.

Fig. 5 is a perspective view of a cross section of two contiguous floor strips or plates which form a part of a horizontal floor, occupying a downwardly spaced relation to the bottoms of the inserted pots.

Fig. 6 is a fragmental bottom plan view of one of the apertured portions of the cover plates of the food table, illustrating one of the spring-impelled doors for automatically closing the opening whenever a pot is removed therefrom.

Figure 1:
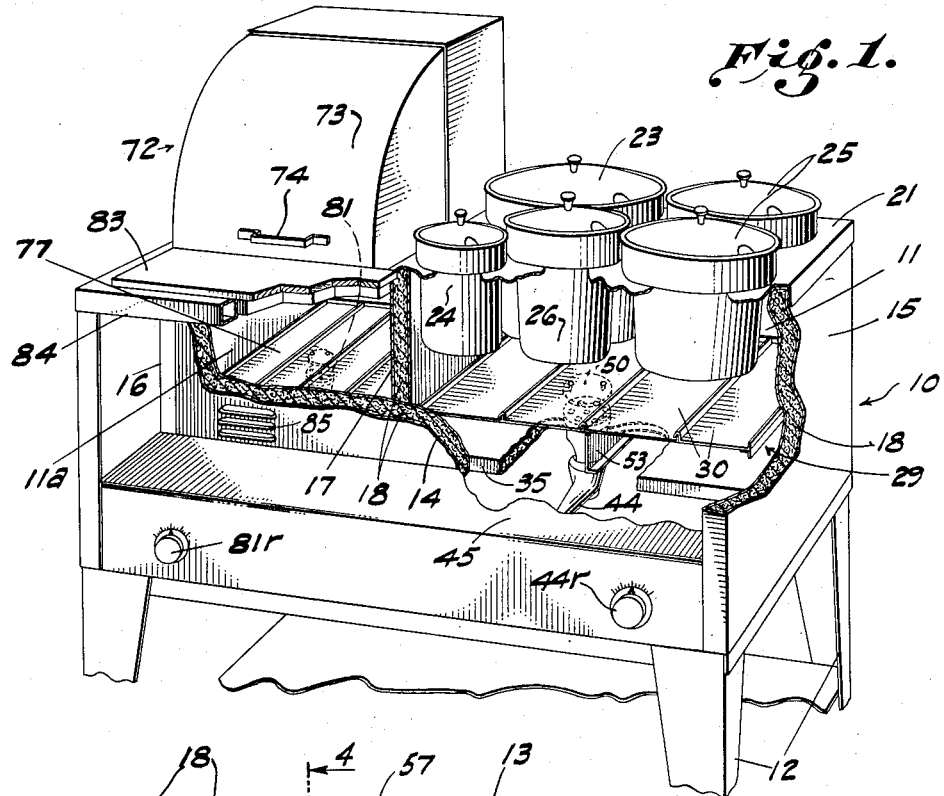

Referring in detail to the drawings, the table, or stove structure, shown in Fig. 1, comprises a casing 10 containing hot air chambers 11 and 11a and shown supported by legs 12. Said casing has a back wall 13, front wall 14, end walls 15 and 16, and a cross wall 17. All of said walls are shown as being of the double, heat-insulating type being furnished internally with a heat-insulating filling 18.

The main hot-air chamber 11 is furnished with a cover plate 21, having through it a plurality of circular openings which are suitably grouped to receive a set of pots, as shown in Fig. 1. In this view, there are shown a large soup pot 23, a gravy pot 24, two rather large vegetable pots 25, and a small vegetable pot 26, each of said pots having conventional annularly-shouldered portions to support them upon the marginal portions of the pot openings through the plate 21. Below said pots, in a downwardly spaced relation to their bottoms, is a horizontal partition 29, which is of a sectional character, being made up of a plurality of spillage trays 30, the contiguous edge portions of these trays having interfitting flanges 31 and 32, shown in enlarged detail in Fig. 5. From the latter view, it will be seen that the flanges 32, like the flanges 31 against which they abut, are upwardly directed, but are additionally provided with downwardly directed lips 33, thus giving them a saddle-like form which adapts them for setting upon the flanges 31.

Said lips 33 do not extend down as far as the body portions of the plates 31, and hence afford good finger-holds to enable the user to conveniently remove them through the pot openings, together with any spillage which may have collected upon them.

Considerably below the horizontal partition 29 is a floor 35, which underlies the two hot-air chambers 11 and 11a, but which is considerably spaced above the lower edges of the outer walls of the structure, thus having room beneath it for a burner chamber 36. Said floor 35 is likewise of the heat-insulating type, having spaced apart walls, the space between which is filled with the heat insulating material 18.

At about the midwidth of the structure, but nearer to the cross wall 17 than to the end wall 15, there is formed through the floor 35 a burner opening 38. Overlying said opening 38 is a burner plate 39 of the refractory incandescent type, which is preferably apertured in the manner shown in Fig. 2, where it is illustrated as having a central group of relatively small flame exit passages 40, grouped around which are four larger passages 41. It is desirable that said burner plate be made quite thick, as shown, and that the apertures through it taper upwardly. Within the opening 38 is fitted a collar 42, which is slightly less in diameter than said opening, and which has an external flange 43 around its upper end. Said collar and burner plate are separate parts in order that either may be renewed independently of the other if it becomes injured by the intense heat of the burner 44.

Baffle plate 50 is supported by partition structure 29 in a vertically spaced relation to the burner plate 39. Said baffle plate does not contact with said partition structure, but is pendantly supported in a downwardly-spaced relation thereto by any suitable means, as by the screw-bolt members 51. By this arrangement, a proper spreading out of the heat from the burner underneath the partition 29 is provided for.

In order to further control the heat currents, a vertical baffle plate 53 is mounted upon the floor 35 adjacent to the burner plate 39, said vertical plate extending from the cross wall 14 partially across the structure, as shown in Fig. 2. By this arrangement, the hot air currents are caused to travel along the courses, indicated by the arrows in this view, until they emerge from the hot-air chamber through an opening 55 in its front wall.

The burner 44 is shown having a tapered fuel-feed extension 44x, through which the gas feed is automatically regulated by means of the thermostat 57 (see right-hand portion of Fig. 4) said thermostat being operatively connected with the burner in any preferred conventional manner, as indicated by tube 58. A conventional automatic oven heat regulator 44r may be adjusted to control the heat generated by the burner 44. Along the front of the device is shown a sideboard or shelf 45, upon which are shown supported dishes 46 (see Figs. 2 and 4) in a position to be kept hot by the air issuing from the opening 55.

Returning to the cover plate 21 and the group of pots supported thereby as well, shown in Fig. 3, there is formed in said cover plate around each pot opening an annular flange which has an upwardly arched basal portion 59 and a downwardly directed terminal portion 59a. The pot shoulders s rest upon upwardly arched portions of these flanges, thereby spacing them slightly above the cover plate and making it easier to remove the pots.

In order to avoid waste of heat through a pot opening, spring controlled paired shutters 60 are provided to automatically close each opening whenever a pot is removed therefrom, the larger pot openings being each furnished with a pair of shutters, a single shutter sufficing for some of the small openings. From Fig. 3 and Fig. 6, it will be seen that said shutters 60 are semicircularly shaped and that each has formed upon it at the middle of its convex edge a hinge leaf 61 of a spring hinge construction, the spring 62 of which will move the shutter to its closed position whenever pressure of the pot thereagainst is removed.

As shown in Fig. 1 and Fig. 3, at the left side of the cross wall 17, the cover plate 21 has an extension 70 which overlies the auxiliary hot-air chamber 11a. Said extension supports a structure 72 suitable for keeping meat, spaghetti, and the like in a heated condition.

The oven 72, shown in the upper left-hand portion of Fig. 1, is furnished with a cover 73 which may be swung upwardly by means of its handle 74. This oven is over the hot-air chamber 11a, already mentioned. Underlying this hot-air chamber is a substantially horizontal sectional partition 77, which is constructed in substantially the same manner as the partition 29 already described. In the combustion chamber 80 (Fig. 3) below said partition, is shown in dotted lines in Fig. 1 a burner 81, which is desirably built, arranged, and thermostatically controlled in the same manner as the burner 44 which heats the pots. The operation of this burner is manually controllable by means of the oven heat regulator 81r.

In front of the oven 72 is shown a carving board 83, which rests upon a cover section 84.

The chamber 11a is furnished with a louver-guarded front vent 85 in front of which dishes to be kept warm may be placed on the shelf 45, the same as is utilized by the vent 55.

In the operation of the structure which has been described, the food which it is desired to maintain at the highest temperature is placed within the pots 23 and 24, which are located at the same side of the baffle plate 53 as that occupied by the burner 44. Said pots will be suitable to use to contain soups and gravies, while the pots 25 and 26, which are on the opposite side of the baffle 53, may be used advantageously to contain various vegetables, which it is not desired to maintain at so high a temperature.

The stream of heated air produced by the burner will move at a slow rate, because there is no force to produce a draft other than the air-entraining effect of the jets of gas escaping from the burner and the lightening effect of the heat upon the air, which is thus caused to enter in sufficient volume through the air intake opening alongside the bottom of the structure. It is owing largely to this fact, combined with the arrangement of the variously heated pots, which has been described, that an efficient heat economizing arrangement is afforded by the invention. A relatively small amount of heat remains to be dissipated into the outer air by the time the heated air stream reaches the outlet 55, and this is utilized to a considerable extent to keep hot the dishes 46 on the sideboard 45. The automatically operating, spring-closed shutters 60 constitute a further means for preventing waste of heat.

Not only does the invention prevent heat from being wasted, but it also applies the heat in a more uniform manner to the foods as the heated air circulates uniformly around the entire portions of the pots which are located below the level of the cover plate of the heating table, whereas, when a construction is used wherein the bottom portions of the pots are submerged in water, the depth of the body of water used will, at times at least, be unavoidably found too deep or too shallow to correspond with the level of the soups, gravies, or other foods contained in the pots.

It should be understood that the present disclosure is for the purpose of illustration only, and that this invention includes all modifications and equivalents which fall within the scope of the subject matter claimed.

What is claimed is:

1. A food-heating structure, including a casing provided with a front wall, a back wall, and end walls and having a floor in an elevated relation to its bottom, there being a burner opening through said floor, a burner positioned to heat air ascending through said opening, a substantially horizontal partition of heat-conducting material in an upwardly spaced relation to said floor and forming with said floor and said walls a heat compartment, an upstanding baffle adjacent to said burner opening and extending from said front wall to a point adjacent said back wall, said baffle being positioned to partially divide the space between said partition and floor comprising said heat compartment into two communicating chambers, the stream of air heated by said burner passing around one end only of said baffle plate in moving from one of said two chambers into the other, there being an air outlet in the latter chamber for the heated air travelling in the opposite direction to issue after it passes around said end of said baffle plate, and means to support pots above said partition plate at opposite sides of said baffle plates in a position to be heated by air which has absorbed heat from said partition.

2. In a structure of the kind described, a casing having a cover plate which overlies a hot-air chamber, there being a pot opening through said cover plate, a shutter hingedly mounted in an underlying, adjacent relation to said opening, said shutter being depressible by a pot supportable within and upon said opening, and means to automatically move said shutter into a position wherein it closes said opening when the pot is removed therefrom.

3. The subject matter of claim 2 and, said means to move said shutter into its closed position consisting of a spring incorporated into the hinge structure of the shutter.

4. In a structure of the kind described, a casing having a cover plate which overlies a hot-air chamber, there being a pot opening through said cover plate, a pair of shutters, each of which is hingedly mounted in an underlying adjacent relation to one side of said opening, said shutters being located at opposite sides of said opening, said shutters being depressible by a pot supportable within and upon said opening, and means to automatically swing said shutters up to positions wherein they cooperate to close said opening when the pot is removed therefrom.

5. A food-heating structure, including a casing provided with a front wall, a back wall, and end walls and having a floor in an elevated relation to its bottom, there being an opening through said floor, a heating element positioned to heat air ascending through said opening, a substantially horizontal partition of heat-conducting material in an upwardly spaced relation to said floor and forming with said floor and said walls a heat compartment, an upstanding baffle adjacent to said opening and extending from said front wall to a point adjacent said back wall, said baffle being positioned to partially divide the space between said partition and floor comprising said heat compartment into two communicating chambers, the stream of air heated by said heating element passing around one end only of said baffle plate in moving from one of said two chambers into the other, there being an air outlet in the latter chamber for the heated air travelling in the opposite direction to issue after it passes around said end of said baffle plate, and means to support pots above said partition plate at opposite sides of said baffle plate in a position to be heated by air which has absorbed heat from said partition.

6. A food-heating structure, including a casing provided with a front wall, a back wall and end walls, and a floor in an elevated relation to its bottom, a portion of which extends frontwardly of said front wall to form a dish supporting shelf, there being an opening through said floor, a heating element positioned to heat air ascending through said opening, a substantially horizontal partition of heat-conditioning material in an upwardly spaced relation to said floor and forming with said walls a heat compartment, an upstanding baffle adjacent to said opening and extending from said front wall to a point adjacent said back wall, said baffle being positioned to partially divide the space between said partition and floor comprising said heat compartment into two communicating chambers, the stream of air heated by said heating element passing around one end only of said baffle plate in moving from one of said two chambers into the other, there being an air outlet in the front wall of the latter chamber adjacent said dish supporting shelf for the heated air to pass after it travels around said end of said baffle plate, and means to support food in containers above said partition at opposite sides of said baffle plate in a position to be heated by air which has absorbed heat from said partition to be served on plates mounted on said dish support and warmed by the heated air which passes through said air outlet.

WILLIAM H. C. NESS.
MELVILLE L. SILVERSTONE.